(12) United States Patent
Stander et al.

(10) Patent No.: US 9,815,479 B2
(45) Date of Patent: Nov. 14, 2017

(54) SYSTEM AND METHOD FOR OVERLOAD PROTECTION

(71) Applicant: Deere & Company, Moline, IL (US)

(72) Inventors: Francois Stander, Dubuque, IA (US); Jeremy B. Shuler, Durango, IA (US); Jason J. Foley, Hazel Green, WI (US); Daniel A. Griswold, Bettendorf, IA (US); Mark J. Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 65 days.

(21) Appl. No.: 14/923,865

(22) Filed: Oct. 27, 2015

(65) Prior Publication Data
US 2017/0113699 A1    Apr. 27, 2017

(51) Int. Cl.
| | |
|---|---|
| *B60W 50/00* | (2006.01) |
| *B60W 10/04* | (2006.01) |
| *B60W 10/30* | (2006.01) |
| *B60W 40/13* | (2012.01) |
| *B60P 1/16* | (2006.01) |

(52) U.S. Cl.
CPC ......... *B60W 50/0098* (2013.01); *B60P 1/162* (2013.01); *B60W 10/04* (2013.01); *B60W 10/30* (2013.01); *B60W 40/13* (2013.01)

(58) Field of Classification Search
CPC .. B60W 50/0098; B60W 10/04; B60W 40/13; B60W 10/30; B60P 1/162; E02F 9/2025; E02F 9/2029

USPC .......................................................... 701/50
See application file for complete search history.

(56) References Cited

U.S. PATENT DOCUMENTS

| 7,326,023 | B2 | 2/2008 | Hagenbuch |
| 8,752,372 | B2 | 6/2014 | Ramler et al. |
| 2006/0001224 | A1 | 1/2006 | Bitter et al. |
| 2015/0051798 | A1 | 2/2015 | Cronholm |

FOREIGN PATENT DOCUMENTS

| EP | 2065689 A1 | 3/2009 |
| KR | 101502245 B1 | 3/2015 |
| KR | 20160041218 A | 4/2016 |

OTHER PUBLICATIONS

John Deere, 250D-II/300D-11 ADTs, Product Brochure, Admitted Prior Art.
Volvo Construction Equipment, A35F, A4OF Volvo Articulated Haulers 33.5-39t, 447-476hp, Feb. 2015.
United Kingdom Intellectual Property Office Search Report for Application No. GB1615554.1 dated Feb. 27, 2017.

*Primary Examiner* — Genna Mott
(74) *Attorney, Agent, or Firm* — Lorenz & Kopf, LLP

(57) ABSTRACT

An overload protection control system and method are disclosed for an articulated dump truck having a load bin movable between loaded and unloaded positions by hydraulic cylinders of a hydraulic circuit. The overload protection control system includes a source of load data associated with the load bin. The overload protection system also includes at least one controller that receives and processes the load data to determine an overload condition associated with the load bin and determines a speed associated with the work vehicle. The speed is reduced in the overload condition.

20 Claims, 6 Drawing Sheets

SYSTEM AND METHOD FOR OVERLOAD PROTECTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and the protection of the work vehicle against overloading.

BACKGROUND OF THE DISCLOSURE

In the construction industry, various work machines, such as an articulated dump truck, may be utilized in the hauling of loads over rough terrain. In certain examples, the articulated dump truck includes a frame with a load bin pivotally coupled to the frame. One or more hydraulic cylinders are coupled to the load bin to move the load bin between positions relative to the frame.

Generally, the load bin has a rated payload capacity, which is selected to prolong the life of various components of the articulated dump truck. In certain instances, however, an operator of the articulated dump truck may exceed the rated payload capacity to reduce an amount of time spent on a work site, for example. By exceeding the rated capacity and overloading the load bin, the operational life of various components of the articulated dump truck may be compromised.

SUMMARY OF THE DISCLOSURE

The disclosure provides a system and method for protecting a work vehicle against an overload condition.

In one aspect the disclosure provides an overload protection system for a work vehicle having a load bin movable between loaded and unloaded positions by hydraulic cylinders of a hydraulic circuit. The overload protection system includes a source of load data associated with the load bin. The overload protection system also includes at least one controller that receives and processes the load data to determine an overload condition associated with the load bin and determines a speed associated with the work vehicle. The speed is reduced in the overload condition.

In another aspect the disclosure provides an overload protection method for a work vehicle having a load bin movable between loaded and unloaded positions by hydraulic cylinders of a hydraulic circuit. The method includes determining, by at least one controller, an overload condition for the load bin. The method also includes generating, by the at least one controller, a control command for the hydraulic circuit to drive the hydraulic cylinders to move the load bin between the loaded and unloaded positions at a speed based on an input. The speed is reduced in the overload condition.

In yet another aspect the disclosure provides an overload protection system for a work vehicle having a load bin movable between loaded and unloaded positions by hydraulic cylinders of a hydraulic circuit. The overload protection system includes a pressure sensor that provides a pressure associated with the hydraulic circuit, and a source of incline data associated with the work vehicle. The overload protection system also includes at least one controller that receives the pressure and the incline data. The at least one controller determines an overload condition or a rated condition associated within the load bin based on the pressure and the incline data. The at least one controller also generates a control command for the hydraulic circuit to drive the hydraulic cylinders to move the load bin between the loaded and unloaded positions at a speed based on an input, and the speed in the overload condition is different than the speed in the rated condition.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
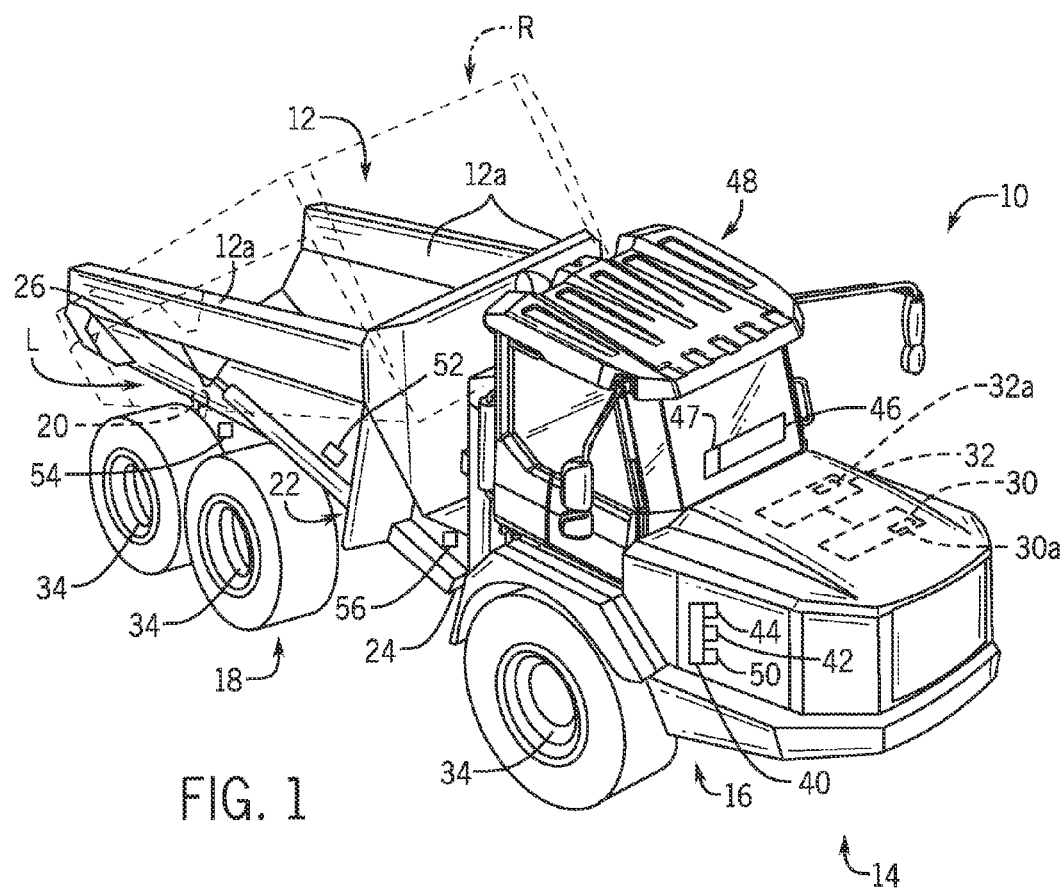
FIG. 1 is a perspective view of an example work machine in the form of an articulated dump truck in which the disclosed overload protection control system and method may be used.

The following describes one or more example embodiments of the disclosed system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the articulated dump truck described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed system for overload protection by controlling load bin movement and/or work vehicle movement, as shown in the accompanying figures of the drawings described briefly above. Generally, the disclosed control systems (and work vehicles in which they are implemented) provide for improved overload protection as compared to conventional systems by reducing a cycle time or speed of the work vehicle. By reducing the cycle time or speed of the work vehicle, overloading of the load bin is discouraged, thereby protecting the work vehicle from the effects of an overload condition. The following description will refer generally to reducing a speed of various components associated with the load bin and/or the work vehicle. It will be understood, however, that the reduction in speed is merely an example, as other suitable techniques for reducing performance of the work vehicle in response to an overload condition may be implemented.

Generally, a load bin may be movable with respect to a work vehicle (or other work machine) by various actuators in order to accomplish tasks with the load bin. Discussion herein may sometimes focus on the example application of moving a load bin configured as a dump bin for an articulated dump truck, with actuators for moving the load bin generally configured as hydraulic cylinders. In other applications, other configurations are also possible. In some embodiments, for example, the load bin may be fixed or not movable relative to the work vehicle. Likewise, work vehicles in some embodiments may be configured as haulers or loaders, such as tractor loaders, crawler loaders or similar machines, or in various other ways.

The disclosed control system may be used to receive operator commands for movement of a load bin between a lowered or loaded position and a raised or unloaded position. The control system determines a load associated with the load bin based on the receipt of the operator commands. The control system may also determine a load associated with the load bin based on other pre-defined operating conditions, such as a shifting of the articulated dump truck from a park range to a drive gear range, which may indicate the movement of the articulated dump truck away from a loading dock. In various embodiments, the control system determines the load associated with the load bin based on a pressure sensed in the hydraulic circuit and a slope or incline associated with the articulated dump truck. In certain embodiments, the control system determines the load associated with the load bin based on sensor signals or sensor data from an onboard weight sensor associated with the load bin. As one example, one embodiment of the disclosed control system may raise the load bin slightly when it detects that the articulated dump truck has been loaded and/or is moving after being loaded. By raising the load bin slightly, the control system has caused the pressurization of the hydraulic circuit to a sufficient pressure to actuate the hydraulic cylinders, and this pressure is dependent on the load in the load bin. By receiving this hydraulic pressure, the control system may determine whether the articulated dump truck is in an overload condition before it has completed its route to an unloading zone, enabling the control system to limit the speed of the articulated dump truck while it travels to the unloading zone.

Once the control system has determined the load associated with the load bin, the control system determines whether the load in the load bin exceeds a threshold, such as a rated payload capacity for the load bin. In certain instances, the threshold may be a certain percentage above the rated payload capacity, such as about 120 percent of the rated payload capacity.

If the load is determined to be above the threshold, the control system determines an overload condition of the articulated dump truck. If the load is determined to be at or below the threshold, the control system determines a rated condition of the articulated dump truck. Based on the determination of the overload condition, the control system outputs one or more notifications that indicate or warn the operator that the articulated dump truck is in the overload condition. In addition, in the overload condition, the control system outputs one or more control signals to various components of the articulated dump truck to discourage the overloading of the load bin. In certain examples, the control system outputs one or more control signals or control commands to one or more hydraulic pumps and/or control valves in the hydraulic circuit of the articulated dump truck to drive or actuate the one or more hydraulic cylinders associated with the load bin at a speed which is reduced when compared to a speed of the actuation of the one or more hydraulic cylinders in the rated condition. In one example, the command reduces a flow rate of the hydraulic fluid to the one or more hydraulic cylinders in the overload condition as compared to a flow rate of the hydraulic fluid in the rated condition.

In certain embodiments, the control system outputs one or more control signals or control commands to one or more control modules associated with the articulated dump truck to derate the engine. For example, an engine control may reduce an engine speed, and thus, a vehicle speed of the articulated dump truck in the overload condition as compared to the rated condition. In other embodiments, the control system outputs one or more control signals or control commands to a transmission control module associated with a transmission of the articulated dump truck to reduce or limit ranges of gears available for use in the overload condition, as compared to the rated condition.

By modifying or reducing the speed of the movement of the load bin (via the reduction in speed of the one or more hydraulic cylinders) and/or reducing the speed of the movement of the articulated dump truck (via the reduction in engine speed and/or limiting of ranges) in the overload condition, the operator is discouraged from overloading the articulated dump truck. In this regard, the reduction in speed of the movement of the load bin and/or the speed of the articulated dump truck increases a cycle time associated with loading and unloading the articulated dump truck in the overload condition. By increasing the cycle time in the overload condition, productivity associated with the operation of the articulated dump truck is reduced. Thus, while the operators are still able to move the load bin between the lowered, loaded position and the raised, unloaded position in the overload position to dump the payload, the efficiency of this operation is reduced, thereby discouraging overloading of the load bin.

As noted above, the disclosed overload protection control system may be utilized with regard to various machines with load bins, including articulated dump trucks and other machines for hauling a payload. Referring to FIG. 1, in some embodiments, the disclosed overload protection control system may be used with an articulated dump truck (ADT) 10 to discourage exceeding a rated payload capacity of, or overloading, a load bin 12 mounted to a vehicle frame 14. It will be understood that the configuration of the ADT 10 is presented as an example only.

In the embodiment depicted, the vehicle frame 14 includes a first, front frame portion 16 and a second, rear frame portion 18, which are coupled together via an articulation joint (not shown) to enable pivotal movement between the front frame portion 16 and the rear frame portion 18. The load bin 12 is mounted to the rear frame portion 18 via coupling pins 20 that define a pivot point for the load bin 12. The load bin 12 includes one or more walls 12a, which cooperate to define a receptacle to receive a payload. The load bin 12 is generally rated to receive a certain amount of payload (i.e. a rated payload capacity). Loading the load bin 12 above the rated payload capacity results in an overload condition for the load bin 12 and the ADT 10.

One or more hydraulic cylinders 22 are mounted to the rear frame portion 18 and to the load bin 12, such that the hydraulic cylinders 22 may be driven or actuated in order to pivot the load bin 12 about the coupling pins 20. Generally, the ADT 10 includes two hydraulic cylinders 22, one on a left side of the load bin 12 and one on a right side of the load bin 12 in a forward driving direction of the ADT 10. It should be noted, however, that the ADT 10 may have any number of hydraulic cylinders, such as one, three, etc. Each of the hydraulic cylinders 22 includes an end mounted to the rear frame portion 18 at a pin 24 and an end mounted to the load bin 12 at a pin 26. As will be discussed, upon activation of the hydraulic cylinders 22, the load bin 12 may be moved from a lowered, loaded position L (FIG. 1) to a raised, unloaded position R (FIG. 1 in phantom) to dump a payload contained within the load bin 12. It should be noted that the "loaded position" is generally a position in which the ADT 10 may carry a payload, for transport for example, and the "unloaded position" is generally a position in which the ADT 10 may dump a payload, or unload the payload at a work site.

Thus, in the embodiment depicted, the load bin 12 is pivotable vertically relative to a horizontal axis by the one or more hydraulic cylinders 22. In other configurations, other movements of a load bin may be possible. Further, in some embodiments, a different number or configuration of hydraulic cylinders or other actuators may be used. Generally, the overload protection control system disclosed herein may be applied with respect to any type of actuator capable of producing relative movement of a load bin-relative to a vehicle frame.

Thus, it will be understood that the configuration of the load bin 12 is presented as an example only. In this regard, a load bin (e.g., the load bin 12) may be generally viewed as a receptacle that is pivotally attached to a vehicle frame. Similarly, a coupling pin (e.g., the coupling pins 20) may be generally viewed as a pin or similar feature effecting pivotal attachment of a load bin to a vehicle frame. In this light, a tilt actuator (e.g., the hydraulic cylinders 22) may be generally viewed as an actuator for pivoting a receptacle with respect to a vehicle frame.

The ADT 10 includes a source of propulsion, such as an engine 30. The engine 30 supplies power to a transmission 32. In one example, the engine 30 is an internal combustion engine, such as the diesel engine, that is controlled by an engine control module 30a. As will be discussed further herein, the engine control module 30a receives one or more control signals or control commands from a controller 44 to adjust a power output of the engine 30. It should be noted that the use of an internal combustion engine is merely an example, as the propulsion device can be a fuel cell, an electric motor, a hybrid-gas electric motor, etc., which is responsive to one or more control signals from the controller 44 to reduce a power output by the propulsion device.

The transmission 32 transfers the power from the engine 30 to a suitable driveline coupled to one or more driven wheels 34 (and tires) of the ADT 10 to enable the ADT 10 to move. As is known to one skilled in the art, the transmission 32 can include a suitable gear transmission, which can be operated in a variety of ranges containing one or more gears, including, but not limited to a park range, a neutral range, a reverse range, a drive range, a low range, etc. A current range of the transmission 32 may be provided by a transmission control module 32a in communication with the controller 44, or may be provided by a sensor that observes a range shifter or range selection unit associated with the transmission 32, as known to one of skill in the art. As will be discussed, the controller 44 may output one or more control signals or control commands to the transmission 32 or transmission control module 32a to limit the ranges available for the operation of the transmission 32.

The ADT 10 also includes one or more pumps 40, which may be driven by the engine 30 of the ADT 10. Flow from the pumps 40 may be routed through various control valves 42 and various conduits (e.g., flexible hoses) in order to drive the hydraulic cylinders 22. Flow from the pumps 40 may also power various other components of the ADT 10. The flow from the pumps 40 may be controlled in various ways (e.g., through control of the various control valves 42), in order to cause movement of the hydraulic cylinders 22, and thus, the load bin 12 relative to the vehicle frame 14. In this way, for example, a movement of the load bin 12 between the lowered, loaded position L and the raised, unloaded position R may be implemented by various control signals to the pumps 40, control valves 42, and so on.

Generally, a controller 44 (or multiple controllers) may be provided, for control of various aspects of the operation of the ADT 10, in general. The controller 44 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 44 may be configured to execute various computational and control functionality with respect to the ADT 10 (or other machinery). In some embodiments, the controller 44 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 44 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 44 may be in electronic, hydraulic, mechanical, or other communication with various other systems or devices of the ADT 10 (or other machinery). For example, the controller 44 may be in electronic or hydraulic communication with various actuators, sensors, and other devices within (or outside of) the ADT 10, including various devices associated with the pumps 40, control valves 42, and so on. The controller 44 may communicate with other systems or devices (including other controllers) in various known ways, including via a CAN bus (not shown) of the ADT 10, via wireless or hydraulic communication means, or otherwise. An example location for the controller 44 is depicted in FIG. 1. It will be understood, however, that other locations are possible including other locations on the ADT 10, or various remote locations.

In some embodiments, the controller 44 may be configured to receive input commands and to interface with an operator via a human-machine interface 46, which may be disposed inside a cab 48 of the ADT 10 for easy access by the operator. The human-machine interface 46 may be configured in a variety of ways. In some embodiments, the human-machine interface 46 may include one or more joysticks, various switches or levers, one or more buttons, a touchscreen interface that may be overlaid on a display 47, a keyboard, a speaker, a microphone associated with a speech recognition system, or various other human-machine interface devices.

Various sensors may also be provided to observe various conditions associated with the ADT 10. In some embodiments, various sensors 50 (e.g., pressure, flow or other sensors) may be disposed near the pumps 40 and control valves 42, or elsewhere on the ADT 10. For example, sensors 50 may include one or more pressure sensors that observe a pressure within the hydraulic circuit, such as a pressure associated with at least one of the one or more hydraulic cylinders 22. The sensors 50 may also observe a pressure associated with the pumps 40. In some embodiments, various sensors may be disposed near the load bin 12. For example, sensors 52 (e.g. load sensors) may be disposed on or coupled near the load bin 12 in order to measure parameters including the load in the load bin 12 and so on. In some embodiments, the sensors 52 may include onboard weight (OBW) sensors, etc. In addition, the sensors 52 may be coupled to various locations on the ADT 10, such as one or more struts (not shown) of the ADT 10, to measure a load of the ADT 10. Thus, the sensors 52 observe a load of the ADT 10, which may be indicative of the load of the load bin 12 or the load of the ADT 10, from which the load of the load bin 12 may be extracted based on a known load of an empty ADT 10.

Various sensors 54 may also be disposed on or near the rear frame portion 18 in order to measure parameters, such as an incline or slope of the rear frame portion 18, and so on. In some embodiments, the sensors 54 may include an inclinometer coupled to or near the rear frame portion 18, etc. In certain embodiments, the sensors 54 may be microelectromechanical sensors (MEMS) that observe a force of gravity and an acceleration associated with the ADT 10. In addition, various sensors 56 are disposed near the rear frame portion 18 in order to observe an orientation of the load bin 12 relative to the rear frame portion 18. In some embodiments, the sensors 56 include angular position sensors coupled between the rear frame portion 18 and the load bin 12 in order to detect the angular orientation of the load bin 12 relative to the rear frame portion 18.

The various components noted above (or others) may be utilized to control movement of the load bin 12 via control of the movement of the one or more hydraulic cylinders 22. Accordingly, these components may be viewed as forming part of the overload protection control system for the ADT 10. Each of the sensors 50, 52, 54 and 56 may be in communication with the controller 44 via a suitable communication architecture.

In various embodiments, the controller 44 outputs one or more control signals or control commands to the hydraulic cylinders 22 associated with the load bin based on one or more of the sensor signals received from the sensors 50, 52, 54 and 56, and input received from the human-machine interface 46, and further based on the overload protection control system and method of the present disclosure. The controller 44 outputs the one or more control signals or control commands to the pumps 40 and/or control valves 42 associated with hydraulic cylinders 22 to reduce a speed of the hydraulic cylinders 22 based on one or more of the sensor signals received from the sensors 50, 52, 54 and 56, and input received from the human-machine interface 46. In some embodiments, the controller 44 outputs the one or more control signals or control commands to reduce a flow rate of the hydraulic fluid to the pumps 40 and/or control valves 42, and the reduction in the flow rate slows or reduces the speed of the hydraulic cylinders 22. The controller 44 also outputs the one or more control signals or control commands to the engine control module 30a to reduce a speed of the engine 30 based on one or more of the sensor signals received from the sensors 50, 52, 54 and 56, and input received from the human-machine interface 46. The controller 44 outputs the one or more control signals or control commands to the transmission control module 32a to reduce a number of ranges available for the transmission 32 based on one or more of the sensor signals received from the sensors 50, 52, 54 and 56, and input received from the human-machine interface 46. The reduction in the number of ranges available slows or reduces the speed of the ADT 10. By reducing the speed of the hydraulic cylinders 22, the speed of the engine 30 and/or the ranges available to the transmission 32, a movement associated with the ADT 10 is reduced in an overload condition, thereby discouraging the overloading of the load bin 12.

As an alternative, certain embodiments may utilize an ejector body instead of the tipped body for the load bin 12 shown for ADT 10. In such alternates, the ADT 10 may be substantially the same, with the exemption of the movement of the load bin 12 itself between a loaded position to carry a payload and an unloaded position to dump or unload a payload. In this alternative, an actuator such as a hydraulic cylinder, similar to hydraulic cylinders 22, or a motor may move a headboard through the load bin to eject material or a payload. In both these alternates and in ADT 10, the load bin may be said to be movable between a loaded position (e.g., headboard located at a retracted position for an ejector body to receive the payload, or lowed position L for ADT 10) and an unloaded position (e.g., headboard located at an extended position for an ejector body to unload the payload, or unloaded position R for ADT 10). In the example of an ejector body, the hydraulic cylinder associated with the headboard may be responsive to one or more control signals from the controller 44. For example, the controller 44 may output the one or more control signals or control commands to the pumps 40 and/or control valves 42 associated with hydraulic cylinder of the headboard to reduce a speed of this hydraulic cylinder based on one or more of the sensor signals received from the sensors 50, 52, 54 and 56, and input received from the human-machine interface 46. Thus, in an overload condition, the speed of the hydraulic cylinder associated with the ejector body may also be slowed to discourage overloading of the load bin.

Figure 2:
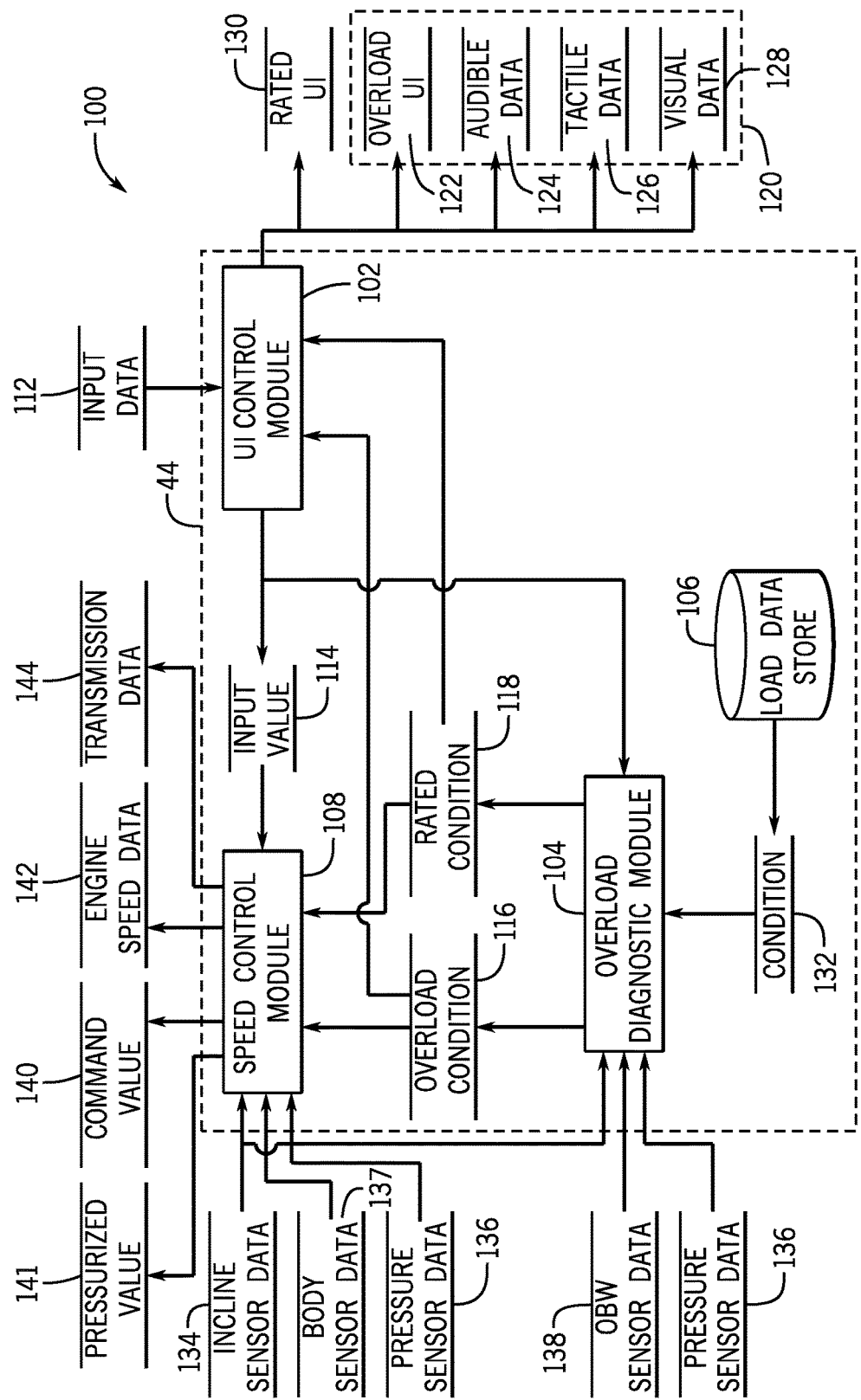
FIG. 2 is a dataflow diagram illustrating an example overload protection control system in accordance with various embodiments.

Referring now also to FIG. 2, a dataflow diagram illustrates various embodiments of an overload protection control system 100 for the ADT 10, which may be embedded within the controller 44. Various embodiments of the overload protection control system 100 according to the present disclosure can include any number of sub-modules embedded within the controller 44. As can be appreciated, the sub-modules shown in FIG. 2 can be combined and/or further partitioned to similarly control the hydraulic cylinders 22 for moving the load bin 12 between the lowered, loaded position L and the raised, unloaded position R, and to control the speed of the ADT 10 via the engine control module 30a and/or transmission control module 32a. Inputs to the overload protection control system 100 may be received from the sensors 50, 52, 54 and 56 (FIG. 1), received from the human-machine interface 46 (FIG. 1), received from other control modules (not shown) associated with the ADT 10, and/or determined/modeled by other sub-modules (not shown) within the controller 44. In various embodiments, the controller 44 includes a user interface (UI) control module 102, an overload diagnostic module 104, a load data store 106 and a speed control module 108.

The UI control module 102 receives input data 112 from the human-machine interface 46. The input data 112 includes a command to initiate a movement of the load bin 12. In certain embodiments, the input data 112 includes an amount of current to be supplied to the pumps 40 to drive the hydraulic cylinders 22 to move the load bin 12 between the lowered, loaded position L and the raised, unloaded position R.

The UI control module 102 interprets the input data 112, and sets an input value 114 for the speed control module 108. In one example, the input value 114 includes an amount of current requested by the operator for the movement of the load bin 12 between the lowered, loaded position L and the raised, unloaded position R (or vice versa).

The UI control module 102 also receives as input an overload condition 116 and a rated condition 118. The overload condition 116 indicates that the load in the load bin 12 exceeds the rated payload capacity for the load bin 12, and thus, that the load bin 12 is overloaded. The rated condition 118 indicates that the load in the load bin 12 is at or below the rated payload capacity for the load bin 12, and thus, the load bin 12 is loaded appropriately. Based on the receipt of the overload condition 116, the UI control module 102 outputs one or more notifications 120 to the human-machine interface 46. For example, the UI control module 102 may output an overload user interface 122, audible data 124, tactile data 126 and/or visual data 128. The overload user interface 122 may be a pop-up graphical user interface or other graphical user interface for display on the display 47 that indicates that the load bin 12 is overloaded. For example, the overload user interface 122 may comprise a textual message such as "Warning: Overload Condition," which may be displayed on the display 47. The overload user interface 122 may also include a suitable graphic, such as an icon of the ADT 10 with the load bin 12 in red (or another suitable warning color) for example. The audible data 124 may be an alarm or other audible output to the human-machine interface 46 to audibly alert the operator to the overloaded condition of the load bin 12. The tactile data 126 may be a haptic feedback to the operator output via the human-machine interface 46. The visual data 128 may be output to a warning light associated with the human-machine interface 46 and/or a warning light within the cab 48, which provides a visual indication of the overload condition associated with the load bin 12.

Based on the receipt of the rated condition 118, the UI control module 102 outputs a rated user interface 130. The rated user interface 130 may be a pop-up graphical user interface or other graphical user interface for display on the display 47 that indicates that the load bin 12 is at or below the rated payload capacity. For example, the rated user interface 130 may comprise a textual message such as "Normal Operation," which may be displayed on the display 47. The rated user interface 130 may also include a suitable graphic, such as an icon of the ADT 10 with the load bin 12 in green (or another suitable color) for example.

The load data store 106 stores one or more tables (e.g., lookup tables) that indicate a load within the load bin 12 based on a pressure observed in the hydraulic circuit and an incline associated with the ADT 10. In other words, the load data store 106 stores one or more tables that provide a condition 132 for the load bin 12. The one or more tables may include calibration tables, which are acquired based on experimental data. In various embodiments, the tables may be interpolation tables that are defined by one or more indexes. As an example, one or more tables can be indexed by various parameters such as, but not limited to, pressure and incline, to provide the condition 132.

Figure 3:
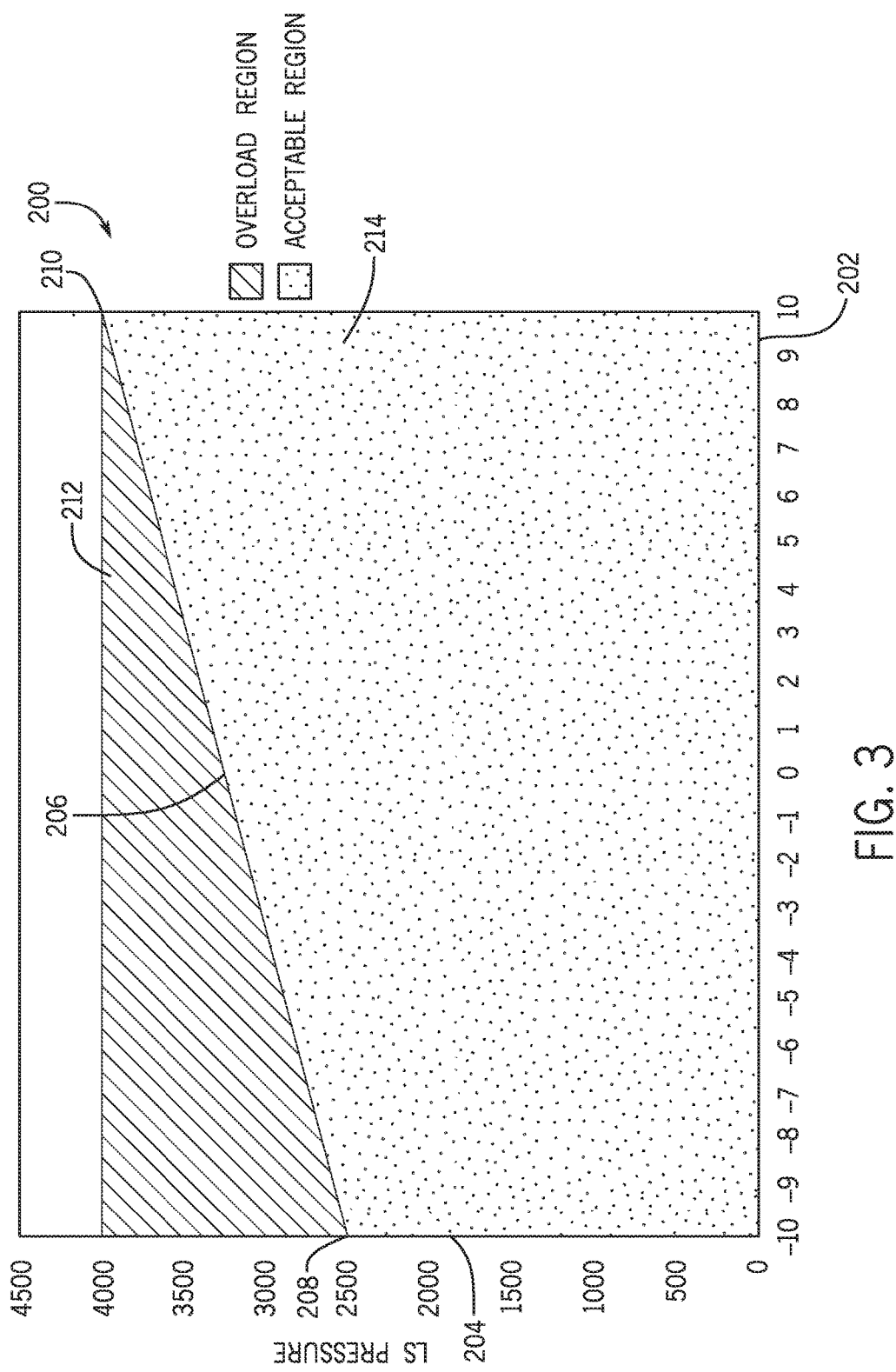
FIG. 3 is a graph illustrating an example look-up table for the overload protection control system.

In one example, the one or more tables of the load data store 106 may be populated based on the graph 200 illustrated in FIG. 3. In FIG. 3, the incline associated with the ADT 10 is along the x-axis 202 and the pressure observed in the hydraulic circuit is along the y-axis 204. In this example, the incline ranges from about negative 10 degrees to about positive 10 degrees, and the pressure ranges from zero to about 4500 pounds per square inch (psi). The ADT 10 is generally orientated facing up the slope or uphill with an incline between the about negative 10 degrees to about zero degrees, as additional pressure is required for the hydraulic cylinders 22 to move the load bin 12 against the force of gravity. The ADT 10 is generally orientated facing down the slope or downhill with an incline between the about positive 10 degrees to about zero degrees, as less pressure is required for the hydraulic cylinders 22 to move the load bin 12 with the force of gravity. In the example of FIG. 3, the hydraulic cylinders 22 have a maximum pressure of about 4000 psi. A line 206 having a positive slope extends from a point 208 on the y-axis 204 to a point 210. An area 212 above the line 206 denotes an overload condition for the load bin 12, and an area 214 below the line 206 denotes a rated condition for the load bin 12. In this example, the points 208, 210 and a slope of the line 206 are acquired from experimental data. It should be noted that these values are merely examples, as these values may vary based on the ADT 10 and/or hydraulic cylinders 22 associated with the load bin 12, and thus, different configurations of work vehicles may have different load data stores.

The overload diagnostic module 104 receives as input the incline sensor data 134 and the pressure sensor data 136. The incline sensor data 134 has sensor data or sensor signals from the sensors 54, which indicate an incline of the rear frame portion 18 relative to the horizontal. In the example of the sensors 54 being MEMS, the sensor signals may undergo additional signal processing, such as filtering, to remove an acceleration of the ADT 10 from the sensor data and to result in an angle of incline for the ADT 10. The pressure sensor data 136 has sensor data or sensor signals from the sensors 50, which indicate a pressure within the hydraulic circuit, such as a pressure associated with the hydraulic cylinders 22. In certain embodiments, the pressure sensor data 136 is dependent on a weight of a load in the load bin 12.

Based on the incline sensor data 134 and the pressure sensor data 136, the overload diagnostic module 104 retrieves the condition 132 from the load data store 106. In the example of FIG. 3, the overload diagnostic module 104 evaluates the incline sensor data 134 (x-coordinate) and the pressure sensor data 136 (y-coordinate) and interpolates a point (x, y) on the graph 200. In this example, the condition 132 is determined based on the location of the interpolated point in area 212 or area 214 of the graph 200. Based on the retrieved condition 132, the overload diagnostic module 104 sets the overload condition 116 or the rated condition 118 for the UI control module 102 and the speed control module 108.

The overload diagnostic module 104 also receives as input onboard weight (OBW) sensor data 138. The onboard weight (OBW) sensor data 138 has sensor data or sensor signals from the sensors 52, which comprise a load of payload in the load bin 12. The overload diagnostic module 104 interprets the OBW sensor data 138, and determines whether the load of the payload measured by the sensors 52 is above a threshold, such as the rated payload capacity for the load bin 12. Based on the determination that the load observed by the sensors 52 is above the threshold, the overload diagnostic module 104 sets the overload condition 116 for the UI control module 102 and the speed control module 108. Based on the determination that the load observed by the sensors 52 is at or below the threshold, the overload diagnostic module 104 sets the rated condition 118 for the UI control module 102 and the speed control module 108.

The speed control module 108 receives as input the input value 114, overload condition 116, the rated condition 118, the incline sensor data 134, the pressure sensor data 136 and body sensor data 137. Based on these inputs, the speed control module 108 outputs a command value 140 for the pumps 40 and/or control valves 42, a pressurized value 141 for the pumps 40 and/or control valves 42, engine speed data 142 for the engine control module 30a and/or transmission data 144 for the transmission control module 32a. In this regard, with reference to FIG. 4, and with continued reference to FIG. 1, a dataflow diagram illustrates various embodiments of a speed control system 300 for the ADT 10, which may be embedded within the speed control module 108. Various embodiments of the speed control system 300 according to the present disclosure can include any number of sub-modules embedded within the speed control module 108. As can be appreciated, the sub-modules shown in FIG. 4 can be combined and/or further partitioned to similarly control the speed of the hydraulic cylinders 22 for moving the load bin 12 between the lowered, loaded position L and the raised, unloaded position R, and to control the speed of the ADT 10 via the engine control module 30a and/or transmission control module 32a. Inputs to the speed control system 300 may be received from the sensors 50, 52, 54 and 56 (FIG. 1), received from the human-machine interface 46 (FIG. 1), received from other control modules (not shown) associated with the ADT 10, and/or determined/modeled by other sub-modules (not shown) within the controller 44. In various embodiments, the speed control module 108 includes a speed determination module 302, a speed data store 304, a vehicle speed control module 306, a value data store 308 and a bin movement control module 310.

The speed data store 304 stores one or more tables (e.g., lookup tables) that indicate a speed for the hydraulic cylinders 22 and/or a speed of the ADT 10 based on the overload condition 116 or the rated condition 118. In other words, the speed data store 304 stores one or more tables that provide a speed value 312 for the movement of the hydraulic cylinders 22 and/or ADT 10. The speed value 312 may be a speed for the movement of the hydraulic cylinders 22 and/or the ADT 10, a speed modifier to modify a normal or standard speed of the hydraulic cylinders 22 and/or the ADT 10 in the overload condition or may be a speed offset to offset the speed of the hydraulic cylinders 22 and/or a speed of the ADT 10 in the overload condition 116 as compared to the rated condition 118. The one or more tables may be calibration tables, which are acquired based on experimental data. In various embodiments, the tables may be interpolation tables that are defined by one or more indexes. As an example, one or more tables can be indexed by various parameters such as, but not limited to, condition (e.g. overload or rated), to provide the speed value 312. It should be noted that the use of the speed data store 304 is merely an example, as the speed value 312 for the overload condition 116 and the rated condition 118 may be factory or default values, which are stored in memory.

The speed determination module 302 receives as input the overload condition 116 and the rated condition 118 from the overload diagnostic module 104 (FIG. 2). Based on the overload condition 116 or the rated condition 118, the speed determination module 302 retrieves the speed value 312 associated with the overload condition 116 or the rated condition 118, and sets hydraulic cylinder speed data 314 for the bin movement control module 310 and sets vehicle speed data 316 for the vehicle speed control module 306. The hydraulic cylinder speed data 314 include the speed value, the speed modifier or the speed offset associated with the operation of the hydraulic cylinders 22. The vehicle speed data 316 include the speed value, the speed modifier or the speed offset associated with the operation of the ADT 10.

In the example of a speed value, in the rated condition 118, the speed determination module 302 sets the hydraulic cylinder speed data 314 to a normal or standard speed value, and in the overload condition 116, the speed determination module 302 sets the hydraulic cylinder speed data 314 to a value below the normal or standard speed value, such that in the overload condition 116, the speed of the one or more hydraulic cylinders 22 are reduced when compared to the speed in the rated condition 118. As a further example of a speed value, in the rated condition 118, the speed determination module 302 sets the vehicle speed data 316 to a normal or standard speed value, and in the overload condition 116, the speed determination module 302 sets the vehicle speed data 316 to a value below the normal or standard speed value, such that in the overload condition 116, the speed of the ADT 10 (e.g. in miles per hour (mph)) is reduced when compared to the speed in the rated condition 118.

In the example of a speed modifier, in the rated condition 118, the speed determination module 302 sets the hydraulic cylinder speed data 314 to one, and in the overload condition 116, the speed determination module 302 sets the hydraulic cylinder speed data 314 to a value below one, such as about 0.5, such that in the overload condition 116 the speed of the one or more hydraulic cylinders 22 are reduced about 50% when compared to the speed in the rated condition 118. As a further example of a speed modifier, in the rated condition 118, the speed determination module 302 sets the vehicle speed data 316 to one, and in the overload condition 116, the speed determination module 302 sets the vehicle speed data 316 to a value below one, such as about 0.5, such that in the overload condition 116 the speed of the ADT 10 is reduced about 50% when compared to the speed in the rated condition 118.

In the example of a speed offset, in the rated condition 118, the speed determination module 302 sets the hydraulic cylinder speed data 314 to zero, and in the overload condition 116, the speed determination module 302 sets the hydraulic cylinder speed data 314 to a value below zero, such as about −5, such that in the overload condition 116 the speed of the one or more hydraulic cylinders 22 are reduced when compared to the speed in the rated condition 118. As a further example of a speed offset, in the rated condition 118, the speed determination module 302 sets the vehicle speed data 316 to zero, and in the overload condition 116, the speed determination module 302 sets the vehicle speed data 316 to a value below zero, such as about −5, such that in the overload condition 116 the speed of the ADT 10 is reduced by about 5 mph when compared to the speed in the rated condition 118.

In certain embodiments, the speed determination module 302 receives as input the incline sensor data 134. In the example of the sensors 54 being MEMS, the speed determination module 302 may receive the acceleration of the ADT 10 from the incline sensor data 134. Based on the acceleration of the ADT 10 from the incline sensor data 134 and the overload condition 116, the speed determination module 302 retrieves the speed value 312 associated with the overload condition 116. Based on the retrieved speed value 312, the speed determination module 302 also sets the hydraulic cylinder speed data 314 and the vehicle speed data 316.

The vehicle speed control module 306 receives as input the vehicle speed data 316. Based on the vehicle speed data 316, the vehicle speed control module 306 determines a speed for the engine 30 and outputs the engine speed data 142. The engine speed data 142 comprises one or more control signals or control commands for the engine control module 30a to control the speed of the engine 30 (i.e. revolutions per minute (rpm)) based on the vehicle speed data 316. Thus, the engine speed data 142 include a standard or unmodified factory speed setting associated with the operation of the engine 30 in the rated condition 118, and a reduced, modified or offset setting or limit for the operation of the engine 30 in the overload condition 116, thereby reducing a speed of the ADT 10 in the overload condition 116.

Based on the vehicle speed data 316, the vehicle speed control module 306 determines ranges for the transmission 32 and outputs the transmission data 144. The transmission data 144 include one or more control signals or control commands for the transmission control module 32a to control the ranges of the transmission 32 based on the vehicle speed data 316. Thus, the transmission data 144 include a standard or unmodified factory range setting associated with the operation of the transmission 32 in the rated condition 118, and a reduced, modified or offset setting or limit for the operation of the transmission 32 in the overload condition 116, thereby reducing a speed of the ADT 10 in the overload condition 116. Note that while the vehicle speed control module 306 is described herein as outputting both the engine speed data 142 and the transmission data 144, the vehicle speed control module 306 may only output one of the engine speed data 142 or transmission data 144, as desired.

The value data store 308 stores one or more tables (e.g., lookup tables) that indicate a value for driving the pumps 40 and/or control valves 42 to drive or actuate the hydraulic cylinders 22 based on the hydraulic cylinder speed data 314. In other words, the value data store 308 stores one or more tables that provide an amount of current to be applied to the pumps 40 and/or the control valves 42 to provide a particular flow rate based on the determined speed for the actuation of the hydraulic cylinders 22 to move the load bin 12. The one or more tables include calibration tables, which are acquired based on experimental data. In various embodiments, the tables may be interpolation tables that are defined by one or more indexes. A value 320 provided by at least one of the tables indicates an amount of current to be supplied to the pumps 40 and/or control valves 42 to provide a particular flow rate for the hydraulic fluid, which corresponds to the determined hydraulic cylinder speed data 314. In this regard, the flow rate of the hydraulic fluid to the hydraulic cylinders 22 determines the speed of movement of the hydraulic cylinders 22, and thus, the speed associated with the movement of the load bin 12. Generally, a flow rate of the hydraulic fluid in the overload condition 116 is less than or reduced compared to a flow rate of the hydraulic fluid in the rated condition 118.

The bin movement control module 310 receives as input the input value 114 and the hydraulic cylinder speed data 314. Based on the receipt of the input value 114 and the hydraulic cylinder speed data 314, the bin movement control module 310 retrieves the value 320 for driving the pumps 40 and/or control valves 42 to actuate the hydraulic cylinders 22 based on the determined speed for the hydraulic cylinders 22. The bin movement control module 310 outputs the retrieved value as command value 140. The command value 140 includes one or more control signals or control commands to the pumps 40 and/or control valves 42 to drive the hydraulic cylinders 22 at the determined speed for moving the load bin 12 between the raised, unloaded position R and the lowered, loaded position L (FIG. 1). In certain embodiments, the command value 140 is an amount of current to be supplied by the controller 44 to the pumps 40 and/or control valves 42 to achieve a particular hydraulic fluid flow rate.

In other embodiments, the bin movement control module 310 receives as input the pressure sensor data 136, in which the pressure sensor data 136 is dependent on the load in the load bin 12. Based on the pressure sensor data 136, the bin movement control module 310 determines a pressurized value 141. The pressurized value 141 may be determined by querying a pressure data store to retrieve a pressure value based on the pressure sensor data 136. The pressure data store may comprise one or more look-up tables, populated based on calibration or experimental data. The bin movement control module 310 outputs the determined pressurized value 141. The pressurized value 141 is one or more control signals or control commands to the pumps 40 and/or control valves 42 to pressurize the hydraulic circuit to a sufficient pressure to actuate or drive the hydraulic cylinders 22 to move the load bin 12 from the lowered, loaded position L to a position between the lowered, loaded position L and the raised, unloaded position R (FIG. 1). In certain instances, the pressurized value 141 may be set for the overload diagnostic module 104. In this instance, the overload diagnostic module 104 may determine the overload condition 116 or the rated condition 118 based on the pressurized value 141.

The bin movement control module 310 also receives as input body sensor data 137. The body sensor data 137 include sensor signals or sensor data from the sensors 56, which indicate the angular orientation of the load bin 12 relative to the rear frame portion 18. Based on the body sensor data 137, the bin movement control module 310 determines whether a movement of the load bin 12 from the lowered, loaded position L to the raised position, unloaded R (and vice versa) has been completed.

Figure 4:
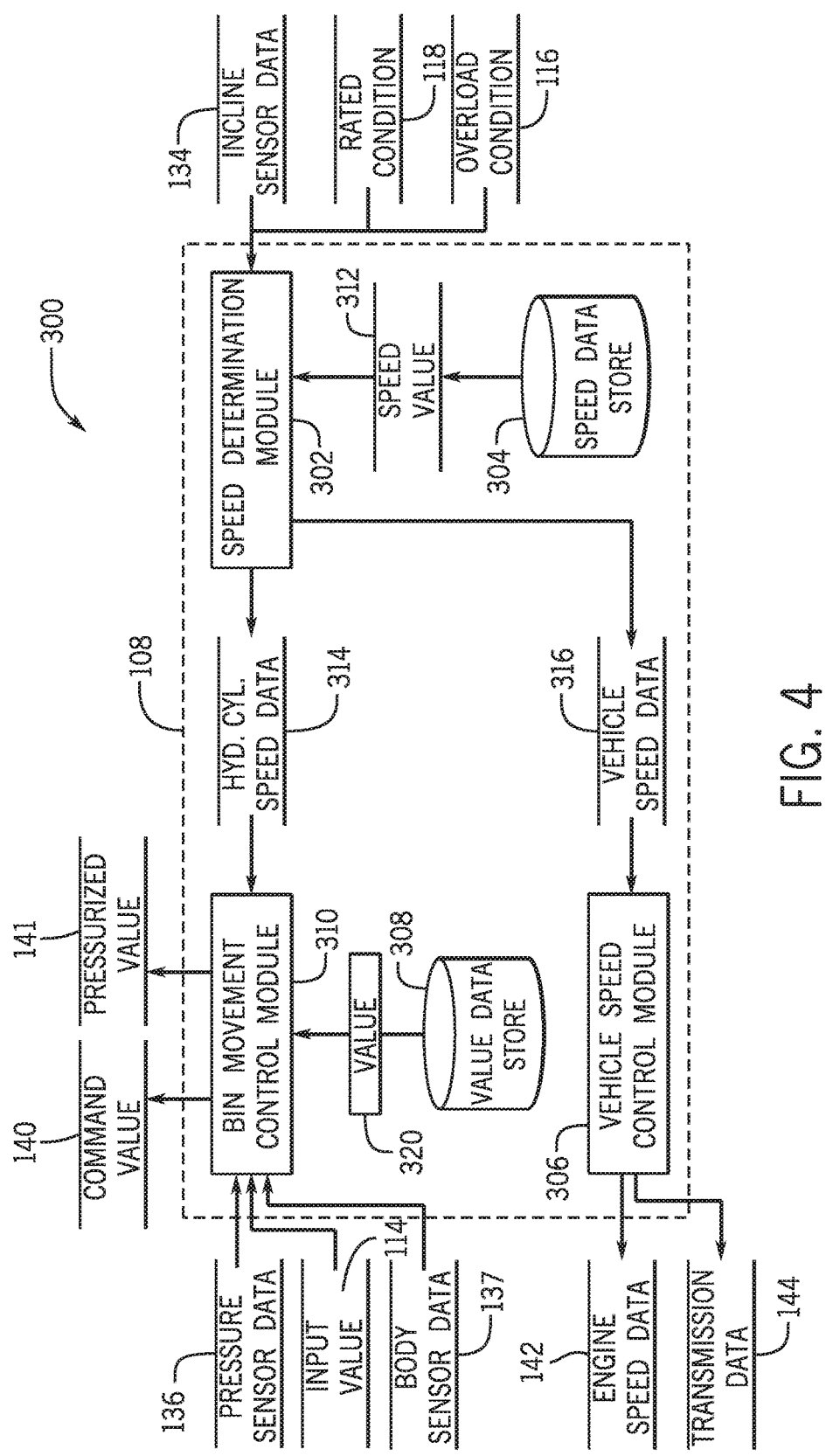
FIG. 4 is a dataflow diagram illustrating an example speed control system in accordance with various embodiments.
Figure 5:
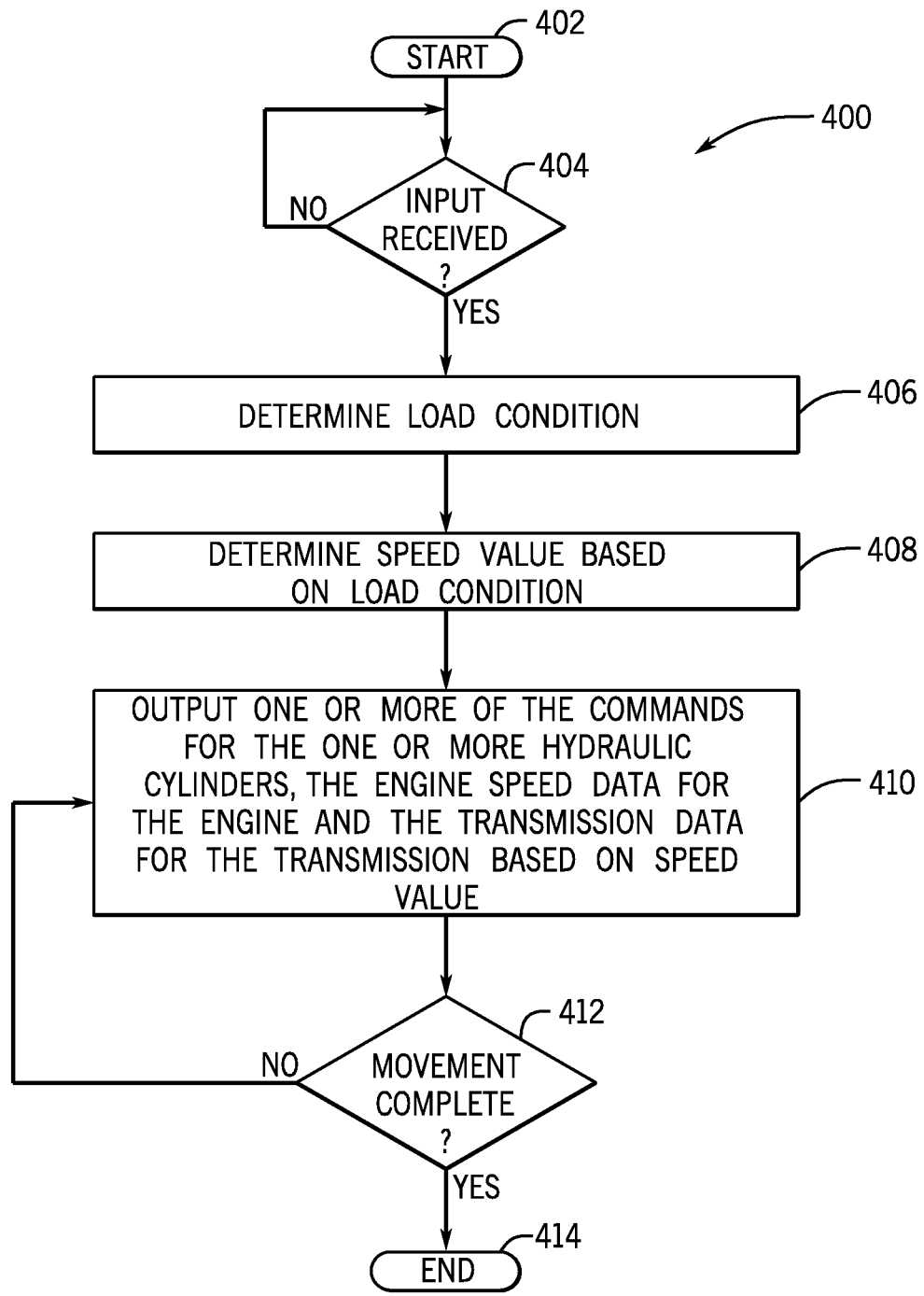
FIG. 5 is a flowchart illustrating an example control method of the disclosed overload protection control system of FIG. 1 in accordance with various embodiments.

Referring now also to FIG. 5, a flowchart illustrates a control method 400 that may be performed by the controller 44 of FIGS. 1-4 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure.

In various embodiments, the method may be scheduled to run based on predetermined events, and/or can run based on the receipt of input data 112.

In one example, with reference to FIG. 5, the method begins at 402. At 404, the method determines whether the input data 112 has been received, which requests a movement of the load bin 12. Based on the receipt of the input data 112, the method proceeds to 406. Otherwise, the method continues to determine whether the input data 112 has been received.

Figure 6:
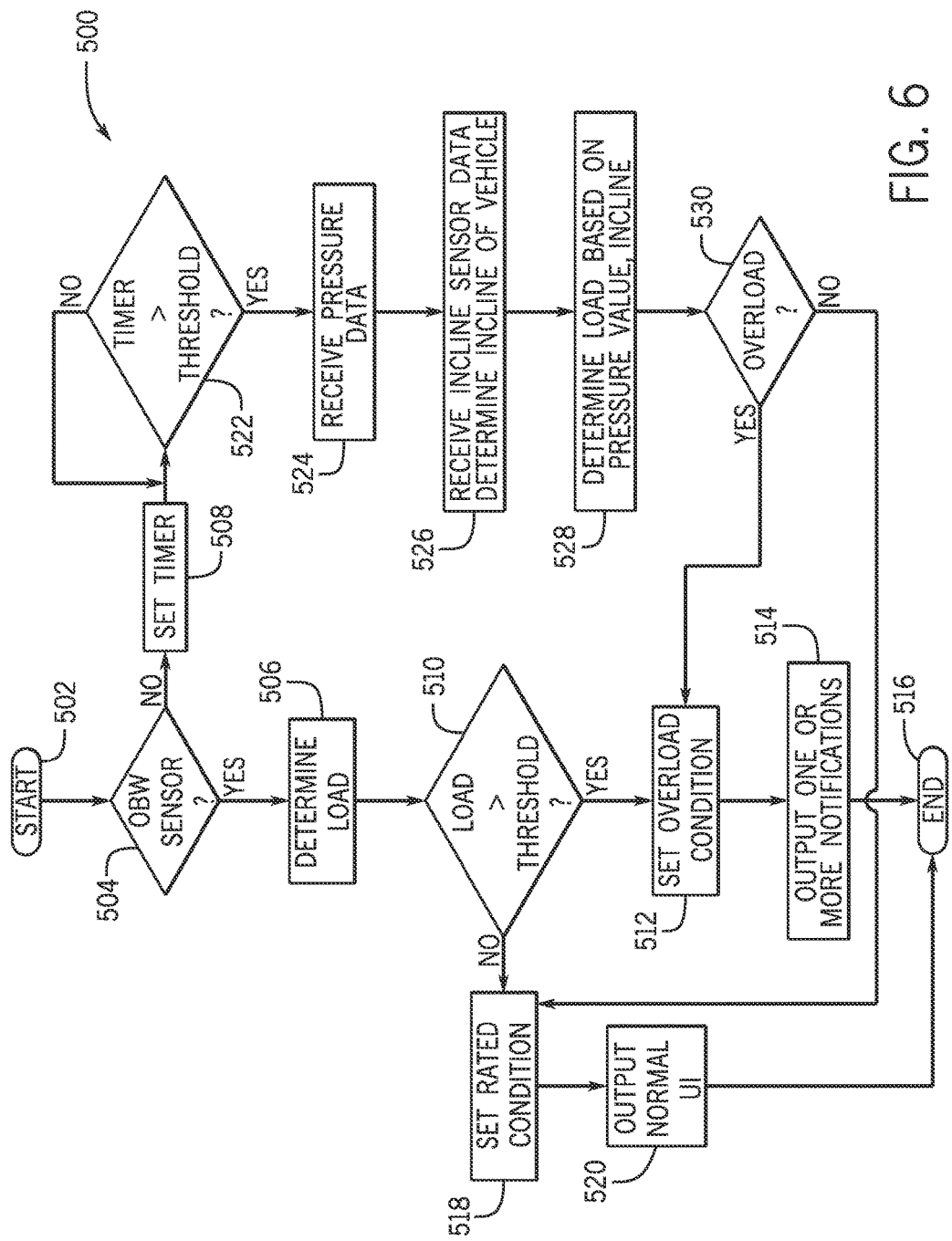
FIG. 6 is a flowchart illustrating an example control method for determining a load associated with the load bin in accordance with various embodiments.

At 406, the method determines a load condition associated with the load bin 12. In one example, with reference to FIG. 6, a flowchart illustrates a control method 500 for determining the load condition (i.e. the overload condition 116 or the rated condition 118) that may be performed by the controller 44 of FIGS. 1-4 in accordance with the present disclosure. Referring to FIG. 6, the method begins at 502. At 504, the method determines whether the ADT 10 includes the sensors 52, such that OBW sensor data 138 is available. If the OBW sensor data 138 is available, the method proceeds to 506. Otherwise, the method proceeds to 508.

At 506, the method determines the load associated with the load bin 12 based on the OBW sensor data 138. At 510, the method determines whether the load determined at 506 is greater than the threshold, such as the rated payload capacity for the load bin 12. If the determined load is greater than the threshold, at 512, the method sets the overload condition 116 and at 514, the method outputs the one or more notifications 120. The method ends at 516.

Otherwise, if the determined load is at or less than the threshold, at 518, the method sets the rated condition 118. At 520, the method outputs the rated user interface 130. The method ends at 516.

At 508, the method sets a timer. At 522, the method determines whether the timer is greater than a threshold period of time, such as about 5 seconds. If false, the method loops. If true, at 524, the method receives the pressure sensor data 136 from the sensors 52, which indicate the pressure within the hydraulic circuit. Thus, the timer acts as a debounce timer, which provides enhanced accuracy in the pressure sensor data 136 by acquiring the pressure sensor data 136 after an initial pressure spike in the hydraulic circuit caused by the receipt of the input data 112. At 526, the method receives the incline sensor data 134 and determines the slope of the ADT 10 based on the incline sensor data 134. At 528, the method determines the load associated with the load bin 12 based on the pressure sensor data 136 and the incline sensor data 134. In one example, the method queries the load data store 106 and retrieves the condition 132 based on the pressure sensor data 136 and the incline sensor data 134. In certain examples, based on the pressure sensor data 136 and the incline sensor data 134, the method interpolates the condition (i.e. load condition). At 530, the method determines whether the condition is an overload condition. If the condition is an overload condition, the method proceeds to 512. Otherwise, the method proceeds to 518.

With reference back to FIG. 5, with the load condition determined, the method proceeds to 408. At 408, the method determines the speed value 312 based on the load condition (the overload condition 116 or the rated condition 118). At 410, the method outputs one or more of the commands (i.e. command value 140) for the one or more hydraulic cylinders 22, the engine speed data 142 for the engine control module 30*a* associated with the engine 30 and the transmission data 144 for the transmission control module 32*a* associated with the transmission 32 based on the speed value. At 412, the method determines whether the movement of the load bin 12 is complete based on the body sensor data 137. If the movement of the load bin 12 is complete, the method ends at 414. Otherwise, the method proceeds to 410.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An overload protection system for a work vehicle having a load bin that at a given location is movable between a loaded position in which the load bin carries a load and an unloaded position in which the load bin does not carry a load, the load bin being movable by hydraulic cylinders of a hydraulic circuit, the overload protection system comprising:
a source of load data associated with the load bin; and
at least one controller that receives and processes the load data to determine an overload condition associated with the load bin:
wherein, when the load bin is in the overload condition, the overload protection system increases an unloading cycle time for the load bin to move from the loaded position to the unloaded position.

2. The overload protection system of claim 1, wherein the overload protection system increases the unloading cycle time by reducing speed of the hydraulic cylinders.

3. The overload protection system of claim 1, wherein the overload protection system increases the unloading cycle time by reducing a speed of a source of propulsion for movement of the work vehicle.

4. The overload protection system of claim 1, wherein the source of load data is a load sensor that provides a signal indicative of a load of the work vehicle.

5. The overload protection system of claim 1, further comprising a pressure sensor that provides a pressure associated with the hydraulic circuit and the at least one controller determines the overload condition associated with the load bin based at least in part on the pressure.

6. The overload protection system of claim 5, further comprising a source of incline data associated with the work vehicle, and the at least one controller determines the overload condition associated with the load bin based at least in part on the pressure and the incline data.

7. The overload protection system of claim 5, wherein the at least one controller controls the hydraulic cylinders to raise the load bin to pressurize the hydraulic circuit with the pressure, the pressure dependent on a weight of a load in the load bin.

8. The overload protection system of claim 1, wherein the at least one controller outputs at least one notification based on the determination of the overload condition.

9. The overload protection system of claim 1, wherein the at least one controller outputs a control command to the hydraulic circuit to reduce a flow of hydraulic fluid to the hydraulic cylinders based on the determination of the overload condition, and the reduced flow of the hydraulic fluid reduces the speed of the hydraulic cylinders.

10. The overload protection system of claim 1, wherein the at least one controller outputs a control command to at least one of an engine and a transmission associated with the work vehicle to reduce a speed of the work vehicle based at least in part on the determination of the overload condition.

11. An overload protection method for a work vehicle having a load bin that at a given location is movable between a loaded position in which the load bin carries a load and an unloaded position in which the load bin does not carry a load, the load bin being movable by hydraulic cylinders of a hydraulic circuit, the method comprising:
  determining, by at least one controller, an overload condition for the load bin; and
  when the load bin is in the overload condition, generating, by the at least one controller, a control command to increase an unloading cycle time for the load bin to move from the loaded position to the unloaded position.

12. The method of claim 11, wherein determining the overload condition further comprises:
  receiving load data observed by a load sensor that provides a signal indicative of a load of the work vehicle; and
  determining the overload condition based at least in part on the load data.

13. The method of claim 11, wherein determining the overload condition further comprises:
  receiving a pressure associated with the hydraulic circuit from a pressure sensor; and
  determining the overload condition based at least in part on the pressure.

14. The method of claim 13, wherein determining the overload condition further comprises:
  receiving an incline observed by an incline sensor associated with the work vehicle; and
  determining the overload condition based at least in part on the pressure and the incline.

15. The method of claim 11, further comprising:
  receiving the input from a human-machine interface, the input comprising a command to move the load bin.

16. The method of claim 11, further comprising:
  outputting one or more notifications based on the determining of the overload condition.

17. An overload protection system for a work vehicle having a load bin that a given location is movable between a loaded position in which the load bin carries a load and an unloaded position in which the load bin does not carry a load, the load bin being movable by hydraulic cylinders of a hydraulic circuit, the overload protection system comprising:
  a pressure sensor that provides a pressure associated with the hydraulic circuit;
  a source of incline data associated with the work vehicle; and
  at least one controller that receives the pressure and the incline data, the at least one controller determines an overload condition or a rated condition associated within the load bin based on the pressure and the incline data, and, when the load bin is in the overload condition, the at least one controller:
    generates a control command for the hydraulic circuit to drive the hydraulic cylinders to increase an unloading cycle time for the load bin to move from the loaded position to the unloaded position.

18. The overload protection system of claim 17, wherein the at least one controller outputs a control command to the hydraulic circuit to reduce a flow of hydraulic fluid to the hydraulic cylinders based on the determination of the overload condition, and the reduced flow of the hydraulic fluid reduces a speed of the hydraulic cylinders.

19. The overload protection system of claim 17, wherein the at least one controller outputs one or more notifications based on the determination of the overload condition.

20. The overload protection system of claim 17, wherein the source of incline data is an incline sensor associated with the work vehicle.

* * * * *